United States Patent [19]
Griffith

[11] Patent Number: 4,702,224
[45] Date of Patent: Oct. 27, 1987

[54] BARBECUE PIT

[76] Inventor: Dwight E. Griffith, Rte. 1, Welcome, Minn. 56181

[21] Appl. No.: 19,570

[22] Filed: Feb. 27, 1987

[51] Int. Cl.$^4$ ............................................. F24C 15/08
[52] U.S. Cl. .......................................... 126/8; 126/9 B; 126/25 R; 126/41 R; 99/446; 99/482
[58] Field of Search ................... 126/2, 8, 9 R, 9 B, 126/13, 25 R, 29, 41 R, 137, 276; 99/339, 425, 444, 446, 482

[56] References Cited

U.S. PATENT DOCUMENTS

| | | | |
|---|---|---|---|
| 1,595,846 | 8/1926 | Wood | 126/8 X |
| 1,896,192 | 2/1933 | Cain | 126/8 X |
| 2,212,015 | 8/1940 | Dugan | 126/8 X |
| 2,314,627 | 3/1943 | Millikan et al. | 126/8 X |
| 3,098,428 | 7/1963 | Maxwell | 126/8 X |
| 3,344,737 | 10/1967 | Sanders | 99/446 |
| 3,568,590 | 3/1971 | Grice | 99/446 |

Primary Examiner—Margaret A. Focarino
Attorney, Agent, or Firm—Robert C. Baker

[57] ABSTRACT

The barbecue pit is a masonry structure including a chimney portion and a fire box portion laterally adjacent to and intercommunicating with the chimney portion. The fire box portion is topped by a hood frame which defines the length and width of an access opening into it. Refractory brick line side walls of the fire box portion and terminate to form an upper horizontal ledge upon which a removable metal drip trough structure is supported. The trough structure has a rectangular drip plate oriented to have a predetermined slope. A tail extension section of the drip plate projects well out of the fire box portion into the chimney portion, and separates part of the chimney space into an upper and lower space for dividing air currents into one current for supporting combustion and another for enhancing cooking flavors. The entire metal drip trough structure is removable through said hood frame even though the rectangular drip plate of the drip trough structure is longer than either the width or length of said hood frame access opening.

3 Claims, 6 Drawing Figures

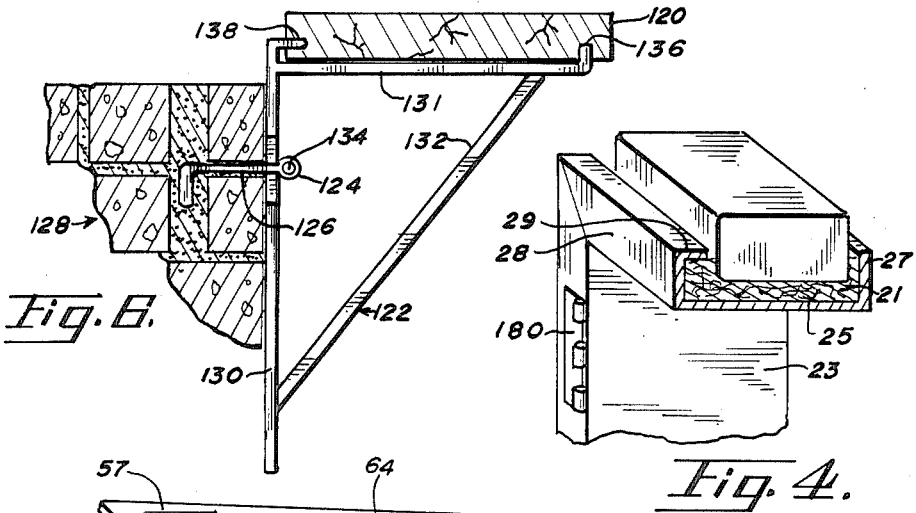
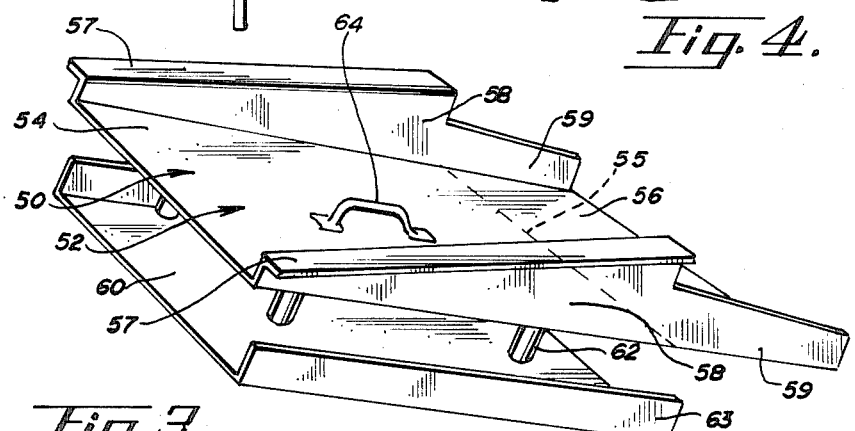
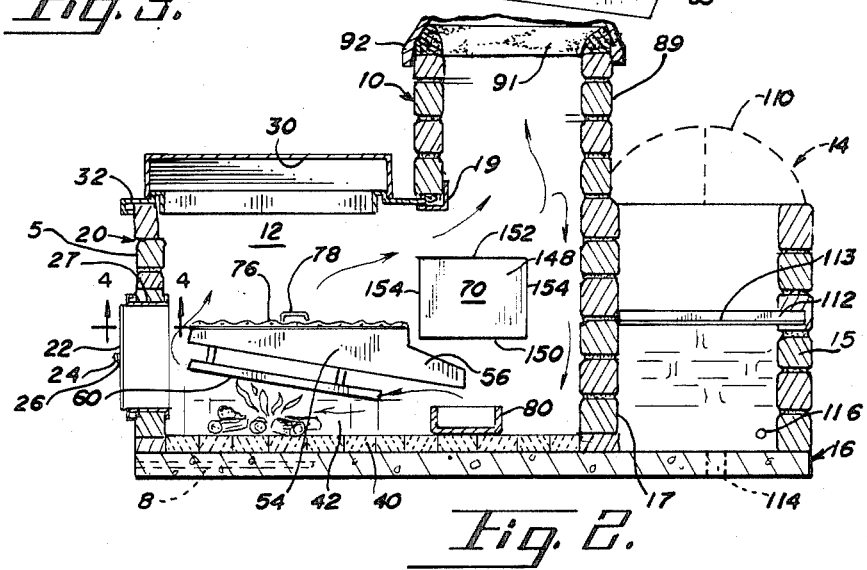

BARBECUE PIT

BACKGROUND OF THE INVENTION

This invention relates to improvements in apparatus for barbecue pit cooking, and particularly to a new and novel masonry barbecue pit especially useful for smoke cooking. The pit is characterized particularly by a drip trough structure easily removable from the fire box portion of the barbecue pit and yet nevertheless having at least one size dimension having an extension into the chimney portion of the barbecue pit and serving as a separator for air flow.

The invention particularly provides a plurality of metal components especially designed for cooperative interaction with masonry components and fire brick features of the barbecue pit so as not only to permit convenient removal of portions desirably cleaned, at least on a periodic basis, but also to facilitate ease of mounting to allow for differences in thermal expansion as between the metal components and the masonry of the barbecue pit.

Masonry barbecue pits have heretofore been proposed including those of the movable or portable type as particularly contemplated by this invention. However, so far as is known, none have oriented various components in the unique relationship provided by this invention, whereby cracking of the masonry portion is substantially prevented despite the thermal expansion differences between that portion and the metal components, and whereby air flow is enhanced not only for combustion but for grease-smoked air to surround food being cooked in the barbecue pit and to pass in a circulatory manner or in a surrounding manner completely around an oven (such as a Dutch oven) immediately adjacent the fire pit portion. Contrary to prior practice, the oven of the barbecue pit of this invention is not in a more or less central location in a chimney.

SUMMARY OF THE INVENTION

The invention provides a barbecue pit comprising a masonry structure including a chimney portion and a fire box portion laterally adjacent to and intercommunicating with the chimney portion. The entire barbecue pit is supported on a concrete slab or base; and portability is the preferred form for the entire barbecue pit. The concrete slab or base is preferably a concrete portable slab suitably reinforced with a netting or metal rods.

The metal frames for the openings through the masonry walls of the pit are preferably channel iron in contour, in the sense that they are generally U-shaped in cross section, with the base portion of the U defining the perimeter of the opening and leg portions of the U-shape of the channel iron extending on opposite sides of the masonry wall. Instead of placing the metal of the frame in direct contact with masonry, an intervening layer of thermally buffering insulation material is interposed. The insulation preferably employed is fiberglass although other flexible or yieldable heat-resistant insulating material may be employed.

An especially important metal component of the barbecue pit is the removable metal drip trough structure. This structure consists of a suspension section and a tail extension section. The suspension section has spaced apart laterally out-turned horizontal flanges from which the remainder of the removable metal drip trough structure depends. These laterally out-turned flanges are united to lateral suspension side walls. The suspension side walls depend from the out-turned horizontal flanges and are united to a rectangular drip plate. The rectangular drip plate has a main section and a tail extension section united to the end of the main section of the plate. The tail extension section has upturned extension side walls, but they lack any lateral out-turned flanges.

A further feature of the removable metal drip trough structure is that of a spaced heat shield plate; and this plate is mounted by spacing pillars underneath the main section of the removable metal drip trough structure. The heat shield plate does not extend underneath the tail extension section of the removable metal drip trough structure. For convenience of removal of the entire removable metal drip trough structure, a drip trough handle member is integrally united on the main section of the rectangular plate thereof.

A preferred optional feature of the invention is that of the metal bracketing for a cutting board. The preferred mounting of such brackets is by way of embedding in the masonry structure certain base elements which carry sleeves that are oriented adjacent a wall of the masonry structure. The bracket for the cutting board is equipped with a pin member easily slid into the sleeve member mounted adjacent the massonry wall; and this type of mounting may be employed in parallel for spaced removable triangular brackets which support a cutting board. The preferred brackets also include locking bars for mating with grooves in the cutting board, to thereby secure the cutting board solidly but nevertheless permit easy removal of the same.

A still further optional feature of the invention is that of a convenience grill suitably mounted on the side of the chimney portion opposite the fire box portion of the composite barbecue cooking structure of the invention.

Several other features and benefits and advantages of the invention will become evident as this description further proceeds.

BRIEF DESCRIPTION OF THE DRAWINGS

FIG. 3 is a schematic perspective view of the drip trough structure;

FIG. 4 is a fragmentary perspective view of the frame for the fire box door and is illustrative of the frame for all side doors into the masonry structure;

FIG. 5 is a schematic perspective view of a corner section of the frame for the hood of the fire box portion; and FIG. 6 is a cross-sectional view along lines 6—6 of FIG. 1, illustrating the bracket mounting arrangement for a cutting board.

DESCRIPTION OF PREFERRED EMBODIMENTS

Figure 1:
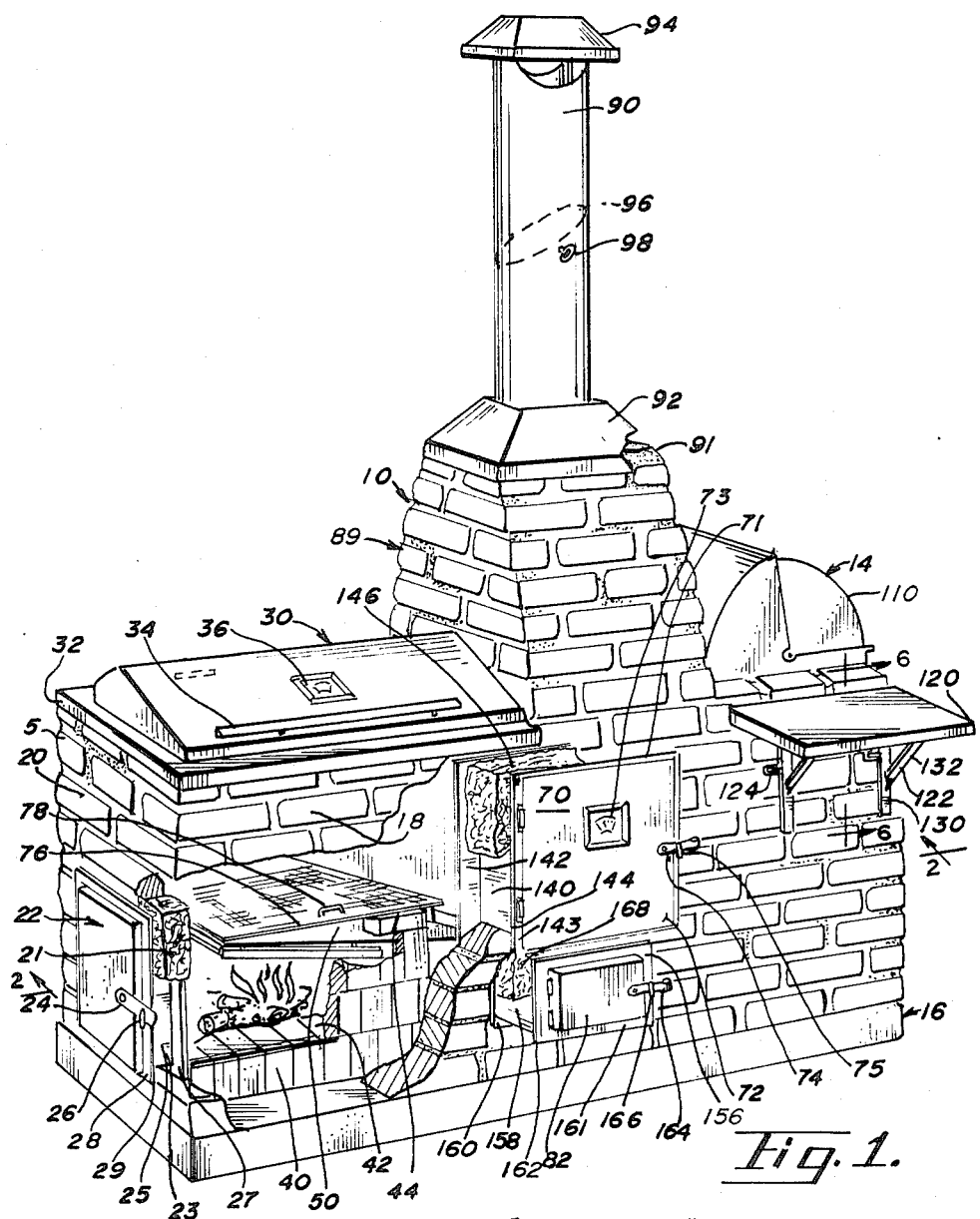
FIG. 1 is a schematic perspective view of the masonry barbecue pit of the invention, with portions broken away to permit interior viewing.
Figure 2:
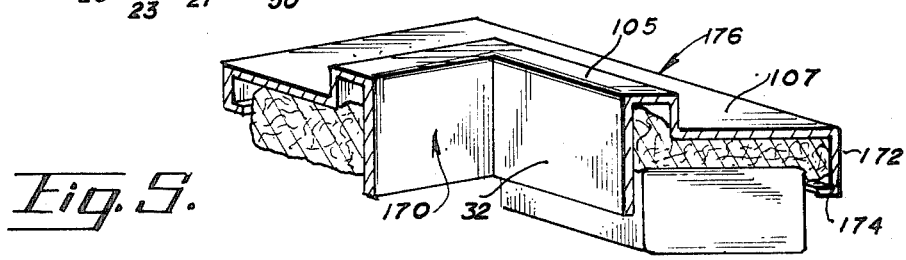
FIG. 2 is cross-sectional view of the barbecue pit, taken on a vertical plane along 2—2 of FIG. 1, with parts broken away.

Referring particularly to FIGS. 1 and 2, the fire pit has a chimney portion 10, a fire box portion 12, and an optional grill portion 14. The entire pit is supported on a concrete slab or base 16.

To be emphasized is that the masonry walls of the chimney portion 10 and fire box portion 12 as well as the optional grill portion 14 are all formed of brick and mortar, with the walls of each portion integrally united with the portions adjacent thereto. The concrete slab or base is reinforced with a netting of metal rods 8.

The fire box portion 12 is defined by spaced apart opposing masonry side walls (the one viewable in FIG. 5 being marked 18), and an end wall 20. The side of the fire box opposite the outer end wall 20 and adjacent the chimney portion 10 is open to the chimney portion 10 in that there is no wall of masonry along that side. The fire box door 22 is located in the outer end wall 20 of the fire box portion 12; and the fire box door 22 itself is of metal and suitably hinged with a fire box door frame hinge 180 (see FIG. 4) to the fire box door channel perimeter frame 23 in any suitable manner. The fire box door 22 is suitably provided with a fire box door pivotable latch 24; and a suitable fire box door latch lock arm 26 is fixed to the frame for the fire box door 22.

The top of the fire box portion 12 is provided with a covering hood 30 suitably hinged to a hood frame 32. The hood frame 32 for the opening covered by the covering hood 30 is mounted on the upper edge of the masonry of the walls of the fire box portion 12. The covering hood 30 is also provided with a hood handle 34 for opening it and a fire box temperature indicator 36 such as a thermostat.

A liner 42 of refractory fire brick 40 is suitably laid, without mortar, along the floor of the fire box portion 12 and laid without mortar along the lower, approximately half of the side walls of the fire box portion 12. No refractory fire brick 40 or mortar is employed for the formation of any wall at the side or edge of the fire box portion 12 interconnected with the chimney portion 10 of the structure.

The fire brick along the interior of the opposing masonry side walls 18 of the fire box portion 12 terminates at approximately half the height of the fire box portion 12. The upper horizontal ledge 44 of the refractory fire brick 40 along the lateral sides of the fire box portion 12 furnishes the surface for supporting the special removable metal drip trough structure 50 of the invention.

Referring particularly to FIG. 3, the details of that removable metal drip trough structure 50 will be explained. The removable metal drip trough structure 50 comprises laterally out-turned horizontal flanges 57, which are supported by the upper horizontal ledges 44 of the fire brick. The suspension side walls 58, depending from the out-turned horizontal flanges 57, terminate at the lower extremity thereof along a slope common to each and oriented at an angle of at least about 10 degrees up to 30 degrees from the out-turned horizontal flanges 57. The rectangular drip plate 52 is oriented with the same slope as the lower extremity edge of the suspension side walls 58, and a main section 54 of the rectangular drip plate 52 is attached to the lower extremity of the suspension side walls 58. A tail extension section 56 projects from the end of the main section 54 that has the greatest dependency from the out-turned horizontal flanges 57. A dotted line in the drawing of FIG. 3 represents the dividing line between the main section 54 and the tail extension section 56. The tail extension section 56 has upturned extension side walls 59 along the lateral edges thereof as a continuation of the suspension side walls 58, but is free of any out-turned horizontal flanges 57. The height of the terminus of the tail extension side walls 59 is no greater than one-third the vertical distance between the out-turned horizontal flanges 57 and the juncture dotted line between the main section 54 and tail extension section 56 of the rectangular drip plate 52.

Additionally, the removable metal drip trough structure 50 includes a heat shield plate 60. The heat shield plate 60 is fixedly mounted on spacing pillars 62 depending from the bottom surface of the main section 54 of the rectangular drip plate 52. The heat shield plate 60 has dimensions approximately equal to the main section 54 of the rectangular drip plate 52. A drip trough handle member 64 is medially located and fixedly mounted on the upper surface of the main section 54 of the rectangular drip plate 52. The entire removable metal drip trough structure 50 is removed through the hood frame 32 even though the rectangular drip plate 52 of the removable metal drip trough structure 50 is longer than either the width or length of the hood frame 32 access opening.

The heat shield plate 60 does not extend under the tail extension section 54. Optionally, but preferably, the lateral sides of the heat shield plate 60 are upturned; and it will be noted that the upturned heat shield side walls 63 fall in a vertical plane approximately coinciding with the vertical plane of the suspension side walls 58 of the removable metal drip trough structure 50. The upturned sides of the heat shield plate 60 terminate along lines spaced from the suspension side walls 58 and the main section 54 of the removable drip trough structure 50. All parts are suitably welded together and formed of iron or steel. Preferably the out-turned horizontal flanges 57, suspension side walls 58, main section 54 and tail extension sections 56, as well as the upturned side walls 59 of the tail extension 56, are all formed from a stamped plate of steel and then bent to form the contour illustrated.

The removable metal drip trough structure 50 is supported in the apparatus (see FIGS. 1 and 2) by resting the out-turned horizontal flanges 57 of that structure on the upper horizontal ledge 44 of the refractory fire brick 40 along the sides of the fire box portion 12. To be noted is that the tail extension section 56 extends out of the fire box portion 12 of the apparatus to a location underneath an oven 70.

Over the out-turned horizontal flanges 57 of the removable metal drip trough structure 50 is placed a cooking grill 76 suitably formed of a perimeter of solid metal rod and a plane of expanded metal of rather thick character welded to the perimeter. The cooking grill 76 is preferably equipped with cooking grill handle members 78 along its lateral sides so as to permit easy removal of it and replacement of it in a rest location along the out-turned horizontal flanges 57 of the removable metal drip trough structure 50.

Both the cooking grill 76 and the removable metal drip trough structure 50 are very easily removed through the top of the fire box portion 12 of the apparatus.

The opposing masonry side walls 18 of the fire box portion 12 continue as side walls of the chimney portion 10. On one of those walls of the chimney portion 10 is located a hinged oven door 72 with an oven temperature indicator 73 such as a thermostat in it. The oven door 72 is hinged to an oven door channel perimeter frame 71 mounted in the opposing masonry side wall 18 of the chimney portion 10. The oven door channel perimeter frame 71 is constructed of oven door frame U-shaped channel members 140. The oven door U-shaped channel members extend on the inside of the masonry side wall as inner leg panels 142, and extend on the masonry wall as outer leg panels 143. The outermost edge of the outside leg panels 143 is bent inward toward the masonry to form an oven door frame outer panel lip 144. The hinged oven door 72 is suitably provided with a pivotable latch 74 which is mounted on the oven door 72. An oven door latch lock arm 75 is fixed to the oven door channel perimeter frame 71. The oven 70 is suitably of the Dutch oven type and welded to the oven door channel perimeter frame 71.

The oven 70 is constructed of an oven bottom wall 150 consisting of a rectangular metal plate welded to the oven door frame. Two oven side walls 154 of vertically oriented rectangular metal plates are fixed to the opposing side edges to the oven bottom wall 150 and also fixed to the oven door channel perimeter frame 71. A top rectangular metal plate 152 connects the top edges of said oven side walls 154 and the oven top wall 152 is also fixed to the upper portion of the channel perimeter frame 71. An oven end wall 148 attaches to the rear edges of the oven side walls and top and bottom walls. In effect, the oven is a metal box of elongated character. The end of the oven 70 opposite the hinged oven door 72 for entry into it suitably may be rested on a recess of masonry in the opposite wall of the chimney portion 10, preferably with thermally buffering insulation material 146 such as fiberglass interposed between the metal of the oven and the masonry ledge on which it rests. It is important to recognize that the oven 70 is not centrally located in the chimney portion 10 of the apparatus. Rather the edge of the oven 70 nearest the fire box portion 12 actually extends underneath the opposing masonry side wall 18 of the chimney portion 10 closest to the fire box portion 12.

Under the hinged oven door 72 is located a door for access into the interior of the barbecue pit, and this door is sometimes referred to as a second door. The frame for this door is entirely comparable to that for the fire box door 22, further discussed below. This second door however is for access to the interior, and particularly for removal and replacement of the drip pan 80. In fact, this second door is commonly referred to as the drip pan door 82. It consists of a metal plate hinged to the drip pan door channel perimeter frame 156. The drip pan door channel perimeter frame 156 is constructed of four U-shaped channel members 158 welded together. Each drip pan door frame U-shaped channel consists of an inner leg panel 160 extending on the inner side of the masonry side wall and an outer leg panel 161 extending outside the masonry side wall 18. The outermost edge portion of outer leg panel 161 is bent inward toward the masonry wall (i.e., inward toward the inner leg panel 160) to form a lip 162. Thermally buffering insulation 168 is placed between all portions of the drip pan door channel perimeter frame and the masonry of the side wall in which it is mounted. The drip pan door 82 is suitably provided with a pivotable latch 164; and a latch lock arm 166 is fixed to the frame of the drip pan door 82. An elongated drip pan 80 is easily slid through this drip pan door 82 and allowed to rest on the floor of the interior of the apparatus. If desired, the floor of concrete may be lined with fire brick along this portion where the drip pan 80 rests.

Observe that the tail extension section 56 of the removable metal drip trough structure 50 actually extends into the chimney portion 10 underneath the oven 70 to a distance of at least about one-fourth of the width of the bottom floor of the oven 70. This arrangement is especially effective to effect removal of the drippings from the area of combustibles in the fire box and nevertheless avoid the necessity of any wall separation between the area for combustibles and the drip pan 80. Neither the fire box door 22 nor the drip pan door 82 into the interior of the apparatus is fitted with solid air-excluding sealing elements. Both permit leakage of air into the interior. If desired, additional openings may be provided for air; but it is quite sufficient to employ doors which are not tightly sealing as the means for allowing air entrance into the interior for not only combustion purposes but also for admixture with smoke for enhancement of cooking flavors.

Significantly, the tail extension section of the drip trough structure actually separates air entering the drip pan door into a fraction for providing oxygen for combustion and a fraction for picking up grease smoke and passing around the food or meat being cooked, which contributes to improved taste.

The masonry chimney portion 10, in addition to having the opposing masonry side walls, has cross wall 17 extending solidly or completely across and connecting with the lateral opposing masonry side walls of the apparatus. The masonry edge wall of the masonry chimney structure 89 adjacent the fire box portion 12 is supported on an angle iron beam 19 which in turn is supported at its ends on the opposing masonry side walls, with this proviso: The contact of the angle iron beam 19 to the opposing masonry side walls for its support at its ends preferably has a layer of fiberglass insulation interposed between the metal and the masonry, and the inner surfaces of the angle iron beam 19 are equipped with a layer of fiberglass insulation before the masonry build-up is placed on them.

The upper terminus of the masonry walls for the chimney portion 10 consists of a masonry chimney structure 89 which is topped by a tapered mortar base 91. The tapered mortar base 91 is topped by a metal collar 92 from which a metal smokestack 90 projects suitably topped with a smokestack cover 94 which prevents rain or snow from falling into the smokestack 90. Within the sleeve of metal forming the smokestack 90 is located a suitable damper 96 and a damper handle 98 for controlling the damper 96 position.

As illustrated in FIG. 1, the metal collar 92 of tapered character meets with the tapered mortar base 91 at the upper edge of the masonry chimney structure 89. In this manner, the metal collar 92 for the smokestack 90 is secured in place, and yet there is an allowance for expansion since the metal expands more greatly than the masonry of the chimney portion 10 under conditions of heat.

Importantly, the damper 96 in the smokestack 90 is used to control the draft of air through the apparatus. Slow cooking is the criterion for tasty morsels; and the leakage of air through the fire box door 22 as well as the drip pan door 82 is just sufficient to allow the burning of combustibles without allowing the flame burning of them. By reducing the intake of air and maintaining a slow draft with suitable adjustment of the damper 96, a rather significant amount of smoke can be created with a circulatory pattern which is highly strange. Adjustment of the damper 96 and the drip pan door 82 to vary air or gaseous passage can effect a flow of smoke even in a downward direction at the side of the oven 70 nearest the cross wall 17.

Still further to be recognized is that the slope of the main section 54 and tail extension section 56 of the removable metal drip trough structure 50 is at least 10 degrees from the horizontal and preferably at least about 30 degrees from the horizontal or even 25 degrees from the horizontal. This slope of at least 10 degrees from the horizontal up to about 30 degrees from the horizontal is a main contributing factor to the effective movement of the air of combustion toward the fire box door 22 at the outer end wall 20 of the apparatus even when the damper 96 of the smokestack 90 is placed in a position to effect high damping. A portion of the air entering the drip pan door 82 is drawn over the combustibles, and a separate portion is drawn along the floor of the trough structure to enhance food flavors. Depending on the position of the damper 96, air entering the drip pan door 82 may also move upwardly along the lateral side of the oven 70 nearest wall 89. However, under high damping conditions, air entering the drip pan door 82 tends to flow toward the combustibles as well as over the base tail extension section 56 of the removable metal drip trough structure 50 around the oven 70 in more or less a clockwise direction. It is to be noted, however, that air around the oven 70 can take a variety of courses adjustable according to the positioning of the damper 96 and the tightness of closure of the fire box door 22 as well as the drip pan door 82.

Referring now to FIG. 4, the fire box door channel perimeter frame 23 basically is of a channel iron contour or U-shaped contour. The base of the U forms the panel defining the opening through the masonry wall into the fire box. An outer leg panel 28 extends on the outside of the end wall masonry and terminates at an inwardly turned lip 29 for the frame. The lip faces the masonry and also faces the fire box door frame inner leg panel 27. Fiberglass or similar insulating material is packed between the metal of the frame and the masonry. The true nature of the insulating material, apart from the fact that it must be heat-resistant and reasonably flexible, is simply that of providing a buffer for thermal expansion of the metal as compared to the much lower thermal expansion of the masonry.

Comparable features are illustrated in FIG. 5 for the hood frame 32; and in all respects the discussion with respect to FIG. 4 is likewise applicable for the hood frame 32. The generally U-shaped channel member 176, as illustrated in FIG. 5, however, is provided with not only a hood frame inner leg panel 170 and a hood frame outer leg panel lip 174 for the hood frame outer leg panel 172, as previously discussed, but also is provided with a raised hood frame section 105 adjacent the connecting point of the internal leg panel 102 so as to provide a holding edge for recessing inside the covering hood 30. The hood frame 32 adjacent the chimney portion 10 is rested on the angle iron beam 19. The lower channel portion 107 consists of horizontal ledge resting on the masonry walls.

On the side of the chimney portion 10 opposite the fire box portion 12 is optionally but preferably located a grill portion 14 for supporting a quick convenience grill 110 such as one fueled by propane or other gaseous fuel. Even a charcoal grill may be optionally located at this end of the composite structure.

The basic features of the masonry at this end where the optional convenience grill 110 may be located simply consist of masonry side walls formed as a continuation of the lateral side wall of the chimney portion 10 plus the final end wall of masonry. Preferably the side walls at this end extend up to approximately the level of the side walls for the fire box portion 12, but the final end wall 15 itself only extends up to the level for the support surface of any suitable convenience grill 110 chosen for installation. As illustrated in FIG. 2, the masonry of the back side wall supports a grill support angle iron 112 which is oriented to provide a sliding ledge 113 for the convenience grill. A similar structure is located on the interior of the side wall not shown in the cross-section of FIG. 2. The final end wall 15 terminates just below the grill support angle iron 112 so that the grill support angle irons 112 are free of blockage and are available for supporting the side edges of the convenience grill.

A drain hole 114 is suitably provided in the concrete slab or base 16 to allow any collection of water from rain or the like to escape; and any suitable gas line hole 116 is placed in a side wall for connecting the tubing or piping from a gaseous fuel source for a convenience grill.

To be discussed now is the mounting for the cutting board 120. The metal for the cutting board mounting consists of a conveniently attachable and detachable bracket 122 plus a sleeve member 124 fixed to a metal tail strap 126. The sleeve member 124 having the fixed metal tail strap 126 is the portion permanently mounted in the masonry of a side wall of the barbecue pit. The strap of metal suitably consists of an arm with a bent tail end 128, and this arm is embedded in the mortar between bricks with the tail suitably embedded in mortar in a hole or recess of a brick. The sleeve member 124 per se is oriented so as to lie in a horizontal direction along a mortared seam between bricks. Two such sleeve members 124 are preferably employed and mounted in lateral position on a masonry side wall. The detachable bracket 122 for the cutting board 120 consists of a vertical leg member 130, a horizontal leg member 131, and a triangular brace member 132 extending between the same. A pin 134 laterally projecting from the vertical leg member 130 is adapted to be slid into a sleeve member 124 fixed in the masonry wall. This action fixes the orientation of the detachable bracket 122, but the detachable bracket 122 nevertheless may be removed for convenient storage or for shifting to a different location if one were to place sleeve members 124 and tail strap members 124 at a different location in the masonry structure 5. Preferably the vertical leg member 130 of the detachable bracket 122 extends upwardly a distance beyond the connection of the horizontal arm member 131, with the upward extension of the vertical leg member 130 being bent or turned parallel to the horizontal arm to form a horizontal locking bar 138. Likewise the outer end of the horizontal arm of the detachable bracket is upwardly turned to form a vertical arm locking bar 136. Cooperative recesses in the cutting board 120 receive these locking bars of the detachable bracket 122 and hold the cutting board 120 in a fixed position for cutting use. However, the cutting board 120 is easily removed from the detachable bracket 122 simply by lifting it along its outer edge to remove the board from the vertical arm locking bar 136 and then sliding the board outwardly to remove it from the horizontal leg locking bar 138.

While this invention may be embodied in other specific forms than that specifically illustrated without departing from the spirit or essential characteristics thereof, the embodiment illustrated is considered to be the most preferred. Nevertheless, the scope of the invention is indicated by the appended claims rather than by the details of description.

That which is claimed is:

1. A barbecue pit comprising a masonry structure including a chimney portion and a fire box portion laterally adjacent to and intercommunicating with the chimney portion, said masonry structure being supported on a concrete base,
   (a) said fire box portion having opposing masonry side walls of equal height and an outer end wall opposite the end of said fire box portion intercommunicating with said chimney portion, and including:
      (i) a hood frame about the perimeter of the upper edge of said masonry walls of said fire box portion, said hood frame defining the length and width of an access opening into said fire box portion, and a covering hood hingedly mounted to said hood frame,
      (ii) a liner of refractory brick extending up said side walls to a height no greater than about three-fourths the height of said side walls and terminating at an upper horizontal ledge below the upper edge of said side walls, and
      (iii) a removable metal drip trough structure supported by said upper horizontal ledge, said drip trough structure comprising laterally out-turned horizontal flanges supported on said upper ledge, suspension side walls depending from said flanges, said suspension side walls terminating at the lower extremity thereof along a slope common to each and oriented at an angle of at least about 10° up to about 30° from said horizontal flanges, a generally rectangular drip plate oriented to have the same slope as the lower extremity of said suspension side walls, said drip plate having a main section fixed to the lower extremity of said suspension side walls and a tail extension section projecting from the end of said main section having the greatest dependency from said horizontal flanges, said tail extension section having upturned extension side walls along the lateral edges thereof as a continuation of said suspension side walls but being free of any out-turned horizontal flanges, said upper edge of said upturned extension side walls of said tail extension section being below said horizontal flanges and having a height at the terminus of said tail extension section no greater than one-third the distance between said horizontal flanges and the juncture between the main section and the tail extension section of said drip plate, a heat shield plate fixedly mounted on spacing pillars depending from the bottom surface of said main section of said drip plate, said heat shield plate having an area dimension approximately equal to said main section of said drip plate, and a drip trough handle member fixedly mounted on the upper surface of said main section of said drip plate for removing said entire metal drip trough structure through said hood frame even though the rectangular drip plate of said drip trough structure is longer than either the width or length of said hood frame access opening,
   (b) said chimney portion including an oven therewithin oriented so that the lower horizontal surface of said oven is below the upper horizontal ledge of said refractory brick liner of said fire box portion, an oven door for access into the interior of said oven, and a drip pan door below said oven door, there being no masonry wall obstructing communication between said fire box portion and said chimney portion,
   (c) said tail extension section of said drip trough structure being sufficiently long to extend under the lower surface of said oven in spaced relationship thereto and to divide the space under said oven into an upper space and a lower space, and
   (d) said drip pan door of said chimney portion being such as to allow access into the interior of said chimney portion for placement of a drip pan underneath the tail extension section of said drip trough structure.

2. The apparatus of claim 1 wherein said outer end wall includes a fire box door channel perimeter metal frame defining an opening through said outer end wall into the interior of said fire box portion, said fire box door channel perimeter frame having U-shaped channel members including an inner leg panel extending along the inside of the outer end wall, an outer leg panel extending along the outside of the outer end wall, said outer leg panel having its outermost portion turned inwardly toward said frame inner leg panel to form a terminal lip, and thermally buffering insulation between the metal of said frame and the masonry of said end wall.

3. The apparatus of claim 1 additionally including a cutting board mounting comprising a sleeve member fixed on the outer surface of a wall of said masonry structure in tight relationship thereto, and a detachable bracket carrying a pin member slidable into said sleeve member.

* * * * *